(12) United States Patent
Grundmann et al.

(10) Patent No.: US 10,978,932 B2
(45) Date of Patent: Apr. 13, 2021

(54) DRONE FOR TRIGGERING SEA MINES

(71) Applicant: Siemens Aktiengesellschaft, Munich (DE)

(72) Inventors: Jörn Grundmann, Grossenseebach (DE); Michael Wycisk, Mönkeberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 211 days.

(21) Appl. No.: 16/081,282

(22) PCT Filed: Feb. 1, 2017

(86) PCT No.: PCT/EP2017/052154
§ 371 (c)(1),
(2) Date: Aug. 30, 2018

(87) PCT Pub. No.: WO2017/148642
PCT Pub. Date: Sep. 8, 2017

(65) Prior Publication Data
US 2019/0092440 A1    Mar. 28, 2019

(30) Foreign Application Priority Data

Mar. 1, 2016   (DE) .................... 10 2016 203 341.7

(51) Int. Cl.
*B63G 8/00*   (2006.01)
*H02K 7/14*   (2006.01)
(Continued)

(52) U.S. Cl.
CPC ............... *H02K 7/14* (2013.01); *B63G 7/06* (2013.01); *H02K 11/014* (2020.08); *H02K 55/00* (2013.01);
(Continued)

(58) Field of Classification Search
CPC ... B63G 7/00; B63G 7/02; B63G 7/06; B63G 2007/005; B63G 2007/065; H02K 7/14; H02K 55/02; H02K 99/00; H02K 99/20
(Continued)

(56) References Cited

U.S. PATENT DOCUMENTS 3,775,626 A    11/1973   Burgbacher ................. 310/67 R
3,946,696 A *  3/1976   Lubnow .................... B63G 7/06
                                                114/221 R
(Continued)

FOREIGN PATENT DOCUMENTS

BE        832177 A    12/1975  ............... B63G 9/00
CN    104554691 A     4/2015  ............. B63H 21/17
(Continued)

OTHER PUBLICATIONS

EP 0125180 A1, U.S. Pat. No. 4,562,789 A.
(Continued)

*Primary Examiner* — Daniel V Venne
(74) *Attorney, Agent, or Firm* — Slayden Grubert Beard PLLC

(57) ABSTRACT

Various embodiments may include a drone for triggering sea mines by means of an external magnetic field. For example a drone may include: a drive having an electric motor; the electric motor comprising a stator and a rotor mounted on a shaft. The stator includes a stator winding arranged on a first carrier. The rotor includes a second carrier and a magnetic or electromagnetic element arranged on the second carrier. The element may be configured to magnetically interact with the stator winding to form a superordinate magnetic field during operation of the electric motor. During operation, the electric motor forms an external magnetic field outside of the electric motor with a magnetic flux density of at least 0.5 mT.

17 Claims, 5 Drawing Sheets

(51) Int. Cl.
*H02K 99/00* (2014.01)
*H02K 55/00* (2006.01)
*H02K 11/01* (2016.01)
*B63G 7/06* (2006.01)
*H02K 55/02* (2006.01)
*B63G 7/00* (2006.01)
*H02K 11/00* (2016.01)

(52) U.S. Cl.
CPC ............ *H02K 55/02* (2013.01); *H02K 99/20* (2016.11); *B63G 2007/005* (2013.01); *H02K 11/00* (2013.01)

(58) Field of Classification Search
USPC ........ 114/20.1, 20.2, 21.1, 21.2, 221 R, 312, 114/313, 316, 318, 337; 440/6; 102/402
See application file for complete search history.

(56) References Cited

U.S. PATENT DOCUMENTS

| | | | | |
|---|---|---|---|---|
| 4,220,108 | A * | 9/1980 | Burt | B63G 7/06 |
| | | | | 102/402 |
| 4,562,789 | A | 1/1986 | Bornhofft et al. | 114/312 |
| 4,885,494 | A * | 12/1989 | Higashi | H02K 9/19 |
| | | | | 505/166 |
| 5,273,465 | A | 12/1993 | Meng | 440/6 |
| 5,598,152 | A * | 1/1997 | Scarzello | B63G 7/06 |
| | | | | 102/402 |
| 5,808,392 | A | 9/1998 | Sakai et al. | 310/214 |
| 6,213,021 | B1 | 4/2001 | Pickett | 102/402 |
| 6,634,273 | B2 * | 10/2003 | Cangelosi | B63G 7/06 |
| | | | | 102/402 |
| 2004/0042150 | A1 | 3/2004 | Swinbanks et al. | 361/144 |
| 2007/0142231 | A1 | 6/2007 | Theobald et al. | 505/100 |
| 2010/0244596 | A1 * | 9/2010 | Husband | H02K 55/02 |
| | | | | 310/64 |
| 2013/0234553 | A1 | 9/2013 | Kusase et al. | 310/114 |

FOREIGN PATENT DOCUMENTS

| | | | | |
|---|---|---|---|---|
| DE | 9420497 U1 | 4/1995 | ............ | B63G 7/06 |
| DE | 69531022 T2 | 5/2004 | ............ | H02K 1/27 |
| DE | 102013102184 A1 | 9/2013 | ............ | H02K 16/02 |
| EP | 0125180 A1 | 11/1984 | ............ | B63G 7/06 |
| EP | 0289692 A1 | 11/1988 | ............ | B63G 7/06 |
| EP | 1901418 A1 | 3/2008 | ............ | F42B 19/24 |
| JP | 5876395 A | 5/1983 | ............ | B63G 7/06 |
| NL | 8702274 A | 4/1989 | ............ | H02K 1/12 |
| NL | 8802840 A | 6/1989 | ............ | H02K 11/00 |
| WO | 2017/148642 A1 | 9/1917 | ............ | B63G 7/06 |
| WO | 02/41474 A1 | 5/2002 | ............ | H02K 11/00 |
| WO | 2004/054873 A1 | 7/2004 | ............ | B63G 7/06 |
| WO | 2015/200557 A1 | 12/2015 | ............ | H02K 37/00 |

OTHER PUBLICATIONS

DE 69531022 T2, U.S. Pat. No. 5,808,392 A.
DE 102013102184 A1, U.S. 2013/0234553 A1.
"Thermoplastic Composition," BGH, GRUR, 6 pages (German language w/ English translation), Feb. 25, 2010.
German Office Action, Application No. 102016203341.7, 7 pages, dated Dec. 5, 2016.
International Search Report and Written Opinion, Application No. PCT/EP2017/052154, 24 pages, dated Apr. 21, 2017.

* cited by examiner

DRONE FOR TRIGGERING SEA MINES

CROSS-REFERENCE TO RELATED APPLICATIONS

This application is a U.S. National Stage Application of International Application No. PCT/EP2017/052154 filed Feb. 1, 2017, which designates the United States of America, and claims priority to DE Application No. 10 2016 203 341.7 filed Mar. 1, 2016, the contents of which are hereby incorporated by reference in their entirety.

TECHNICAL FIELD

The present disclosure relates to drones. Various embodiments may include a drone for triggering sea mines by means of an external magnetic field.

BACKGROUND

In known systems for remote-controlled clearing of sea mines, unmanned drones are equipped with magnetic coils for the purpose of triggering magnetic mines. Said coils generate strong magnetic fields that are capable of causing the sea mines to detonate. With this purpose in mind, the drones are constructed in such a way that at the distance that is typical for the triggering they suffer no damage as a result of the detonation.

Such drones may have their own dedicated drive system. The German Navy, for example, possesses remotely controllable boats of the "Seehund" (seal) type, which are fitted with a diesel engine. The magnetic coil for triggering the mines is integrated into the hull of the remotely controllable boats. The magnetic coil itself is formed from a plurality of turns made of copper cable.

Also well-known in addition to such drones floating on the surface are submarine mine-clearing drones, which either possess their own dedicated drive or can be towed by other (under)water vehicles. According to the prior art, the magnetic coil is also embodied as a separate unit from the drive device.

The prior art mine-clearing drones are very heavy due to the great weight of the magnetic coils required for the strong magnetic fields, and in most cases they are also relatively large. For this reason, the transportation of such drones to different deployment locations is a relatively complicated operation. Transportation by plane in particular is rather difficult on account of the heavy weight. In the case of drones with an independent drive, the propulsion engine also makes its contribution to the heavy weight and volume. Furthermore, an additional energy supply is also necessary for the drive, for example in the form of fuel for a diesel engine or alternatively in the form of electrically stored energy for an electric motor.

SUMMARY

The teachings of the present disclosure may be embodied in a drone for triggering sea mines by means of an external magnetic field which overcomes the cited disadvantages. In particular, it describes a drone which may be comparatively small and with a lightweight form and which nonetheless possesses its own dedicated drive as well as a magnetic triggering system. For example, some embodiments may include a drone (1) for triggering sea mines by means of an external magnetic field ($B_{ext}$), wherein the drone (1) comprises a drive having an electric motor (3) for locomotion in water, wherein the electric motor (3) comprises a stator (11) and a rotor (9) that is rotatably mounted on a rotor shaft (7), wherein the stator (11) has at least one stator winding (17) which is arranged on a first carrier (19), wherein the rotor (9) has a second carrier (20) and, arranged thereon, at least one magnetic or electromagnetic element (15a, 15b, 15c) which is able to interact electromagnetically with the at least one stator winding (17) in such a way that a superordinate magnetic field (B) is formed during operation of the electric motor (3), and wherein the electric motor (3) is embodied in such a way that, during its operation, the external magnetic field ($B_{ext}$) formed outside of the electric motor (3) has at least a magnetic flux density of at least 0.5 mT at said location at least in a subarea thereof.

In some embodiments, the electric motor (3) is embodied in such a way that the rotor (9) is arranged radially inside the stator (11).

In some embodiments, the electric motor (3) is embodied in such a way that the stator (11) is arranged radially inside the rotor (9).

In some embodiments, the magnetic properties of the first carrier (19) and/or of the second carrier (20) are embodied in such a way that, during the operation of the electric motor (3), a magnetic flux of at least 0.5 mT is able to penetrate into an area outside of the electric motor (3).

In some embodiments, the first carrier (19) and/or the second carrier (20) are/is embodied at least in sections from a material which has an effective relative permeability number $\mu_r$ of at most 300, in particular at most 10.

In some embodiments, the electric motor (3) has a nonmagnetic motor housing (13).

In some embodiments, the electric motor (3) is embodied as a synchronous motor, wherein the rotor (9) has at least one element (15a, 15b) for generating a magnetic field, in particular at least one permanent magnet (15a) and/or at least one electrical field coil (15b).

In some embodiments, the electric motor (3) is embodied as an asynchronous motor, wherein the rotor (9) has, as the electromagnetic element, at least one element for forming a closed current path, in particular a squirrel cage or at least one annularly short-circuited or short-circuitable rotor coil.

In some embodiments, the first carrier (19) and/or the second carrier (20) is embodied at least in sections from a material which comprises a nonmagnetic steel and/or plastic.

In some embodiments, the electric motor (3) comprises at least one superconducting element (21).

In some embodiments, the rotor (9) comprises at least one block (21a) made of superconducting material in which a magnetic flux may be impressed in such a way that the at least one block (21a) acts like a permanent magnet.

In some embodiments, the rotor (9) comprises at least one block (21b), wherein each block in each case comprises a plurality of stacked superconducting tape conductors (21c), and wherein a magnetic flux may be impressed in the respective block (21b) in such a way that the block (21b) acts like a permanent magnet.

In some embodiments, the rotor (9) has at least one superconducting field coil (23).

In some embodiments, the at least one stator winding (17) has a superconducting electrical conductor (21).

In some embodiments, the superconducting electrical conductor (21) comprises a high-temperature superconducting material, in particular magnesium diboride and/or a material of the type $REBa_2Cu_3O_x$.

BRIEF DESCRIPTION OF THE DRAWINGS

The teachings of the present disclosure are described below with the aid of several exemplary embodiments and with reference to the attached drawings, in which.

DETAILED DESCRIPTION

Figure 1:
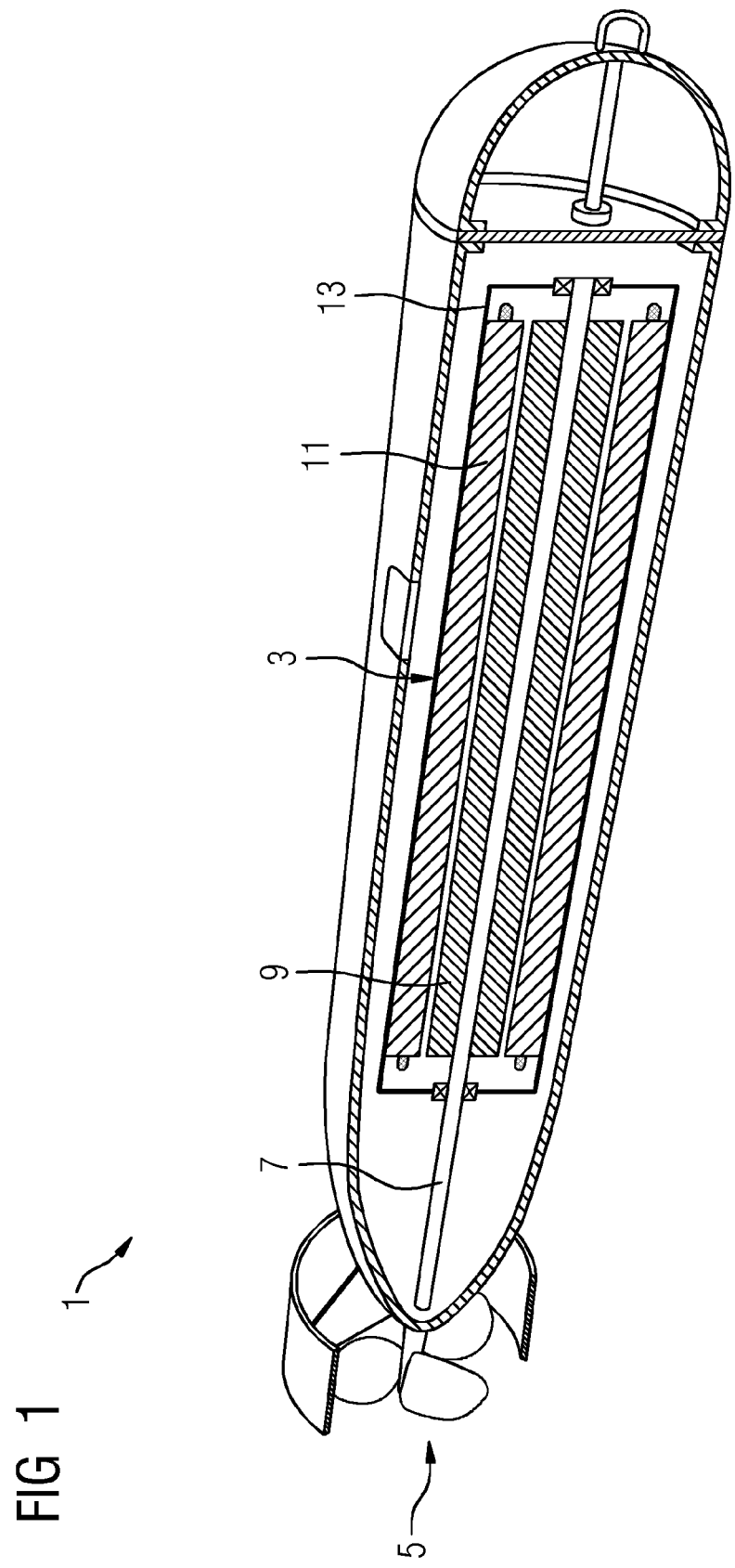
FIG. 1 shows a drone 1 in a schematic longitudinal section, according to the teachings herein.

Various embodiments of the teachings herein may include a drone suitable for triggering sea mines by means of a magnetic field. Some embodiments may comprise a drive having an electric motor for providing locomotion in water, the electric motor comprising a stator and a rotor that is rotatably mounted on a rotor shaft.

The stator has at least one stator winding which is arranged on a first carrier. The rotor has a second carrier and, arranged thereon, at least one magnetic or electromagnetic element which is able to interact electromagnetically with the at least one stator winding in such a way that a superordinate magnetic field is formed during operation of the electric motor. The electric motor is configured in such a way that, during its operation, the external magnetic field that is formed outside of the electric motor achieves a magnetic flux density of at least 0.5 mT at said location in at least a subarea of said external environment.

In some embodiments, irrespective of the precise motor type and its specific type of construction, a drone is able, owing to the interaction of rotor and stator, to form an electromagnetic field that is necessary for its operation. The electric motor is furthermore configured in such a way that, during its operation, a magnetic flux of at least the cited threshold value is able to penetrate into an area outside of the electric motor. For this purpose, the electric motor as a whole, and in particular the carrier of the stator windings, are embodied in such a way that a penetration of such a high proportion of the magnetic flux into said external areas outside of the electric motor is not prevented.

By the arrangement of the at least one stator winding "on a first carrier" is to be generally understood in the present context that said winding is held in some way or other by said first carrier. In this case it is of no consequence whether the winding(s) is (are) mounted on a surface of the carrier or whether the first carrier spatially encloses the windings at least partially. In principle, the winding(s) may be mounted radially internally or externally on the carrier or may also be embedded into the same. What is to be generally understood in this context by the external magnetic field is a magnetic field at a location outside of the electric motor.

In some embodiments, the magnetic field used for the drive during the operation of the electric motor may be used in addition for triggering the sea mines. In conventional electric motors, magnetic flux is typically prevented from penetrating into external areas, among other reasons in order to comply with accepted standards relating to electromagnetic compatibility. To that end, magnetic flux-conducting materials are employed which annularly close the magnetic flux around the internal components of the motor and stop the flux form penetrating into areas lying outside of the rotor.

The cited guidelines relating to electromagnetic compatibility are generally irrelevant in the case of the operation of mine-clearing drones in mine-infested waters, and the customary shielding of the magnetic flux can be dispensed with. This allows the electric motor to fulfill a dual function by being used not only for the drive, but also for triggering the mines. The weight and space required for an additional magnetic coil are saved, and the drone may be implemented in a particularly lightweight and compact design compared to the prior art. As a result it is also readily transportable, as well as energy-saving to operate.

In some embodiments, the rotor is arranged radially inside the stator. In other words, it may be of a type known as an internal rotor machine. In a motor of said type, the magnetic properties of the carrier of the at least one stator winding may then be embodied in such a way that, when the electric motor is in operation, a magnetic flux of at least 0.5 mT is able to penetrate into an area outside of the electric motor.

In an external arrangement of the stator, the carrier of the stator winding(s) may typically completely enclose the rotor radially. It may, for example, be a cylindrical carrier with a circular internal profile, on the inside of which the stator winding(s) is (are) embedded. With such an external arrangement of the first carrier, it is essential that the magnetic properties of said carrier are embodied in such a way that a sufficiently strong penetration of the magnetic field outward is not prevented. Given suitable choice of the magnetic properties of the rest of the components, for example an exterior wall of the drone, it is possible in this way to generate even a magnetic field exceeding the cited threshold value outside of the drone as a whole.

In a conventional internal rotor motor, the carrier of the stator windings typically includes a stator iron yoke which annularly closes the magnetic flux around the internal rotor and effectively prevents the magnetic flux from penetrating into external areas. However, in some embodiments there is no such stator iron yoke in order to enable the magnetic flux to penetrate outward. The first carrier enclosing the rotor does not close the magnetic flux annularly above and beyond the structure of the first carrier.

In some embodiments, the first carrier enclosing the rotor in the manner of a circular cylinder and is therefore not flux-conducting in a closed manner in the azimuthal direction. To that end, it may be completely nonmagnetic, for example. In some embodiments, it may comprise soft-magnetic segments which only conduct magnetic flux into radially external areas, but not to form a closed magnetic flux in the circumferential direction of the rotor. Soft-magnetic azimuthal carrier segments may therefore alternate with nonmagnetic carrier segments in order to enable a desired flux conduction of the superordinate magnetic field and in particular also to conduct the magnetic field outward in the radial direction without closing the flux in the circumferential direction.

In some embodiments, the carrier of the stator winding(s) may comprise multiple sections of a material which has an effective permeability number $\mu_r$—also known as relative permeability—of at most 300. In some embodiments, the effective permeability number $\mu_r$ is around at most 10 only or even around at most 5 only. By choosing a nonmagnetic material of said type it is possible to ensure that the magnetic flux is able to penetrate the external first carrier to a sufficient extent.

In some embodiments, the first carrier may comprise multiple sections of a material which comprises a nonmagnetic steel and/or plastic. Such a plastic-containing material may for example comprise a resin, a thermoplastic, a duroplastic, and/or a glass fiber reinforced plastic.

In some embodiments, the electric motor may comprise a stator arranged inside the rotor. It may therefore be of a type known as an external rotor machine. A high external magnetic field may be generated in a particularly simple manner by means of such an electric motor if the rotor has at least one element for generating a magnetic field and no annularly closed soft-magnetic element is arranged radially outside of the rotor.

In an external rotor machine, the carrier of the rotor, i.e. the second carrier, radially surrounds the carrier of the stator windings, i.e. the first carrier. In some embodiments, the second carrier allows a magnetic flux of at least 0.5 mT to penetrate into an area outside of the electric motor during the operation of the electric motor. In order to achieve this, the then external second carrier may be analogous to the described embodiment variants of the external first carrier. In particular, the second carrier may comprise multiple sections of a corresponding weakly magnetic material. The remaining various embodiments for the carrier are in each case also applicable in particular to that carrier of the two carriers that is disposed radially further outward in the respective machine geometry (internal rotor or external rotor).

Generally, therefore, of the two carriers, the magnetic properties of the carrier disposed radially further outward may be embodied in such a way that a magnetic flux of at least 0.5 mT is able to penetrate into an area outside of the electric motor during the operation of the electric motor. In some embodiments, the electric motor may have a nonmagnetic housing. In this way it is possible to ensure that the magnetic flux also penetrates such a motor housing, and that a sufficiently high external magnetic field for triggering a magnetic mine can be generated.

In some embodiments, the magnetic coupling between stator and rotor is reduced significantly in comparison with conventional motors. Without additional modification, this may lead to a lower power output of the electric motor. In order to compensate for this, additional measures may be taken, as is described in greater detail further below for some instances. Thus, superconducting elements may be employed in the stator and/or rotor in order to generate stronger magnetic fields within a comparable or even smaller design footprint. Even in the case of normally conducting components, measures may be adopted in order to compensate for the lower coupling. Thus, for example, the motor may be implemented longer in the axial direction than would be the case for a comparable motor with stator iron yoke. Alternatively, it is possible to increase the number of turns and/or, in the case of permanent magnetic excitation, to make use of stronger permanent magnets.

In some embodiments, the electric motor may comprise a synchronous motor. In this case the rotor may comprise at least one element for generating a magnetic field. In particular, said element may be at least one permanent magnet and/or at least one electrical field coil. Such a permanently excited electric motor is particularly well suited for generating a comparatively high superordinate magnetic field.

In some embodiments, the electric motor may comprise an asynchronous motor. In this case the rotor may comprise, as the electromagnetic element, at least one element for forming a closed current path. This may be in particular a squirrel cage and/or at least one annularly short-circuited or short-circuitable rotor coil. A short-circuitable though not permanently short-circuited rotor coil may be present, for example, in a type of rotor known as a slip ring rotor. Even with such an asynchronous motor, it is possible to generate sufficiently high external magnetic fields for triggering magnetic mines by means of the electromagnetic interaction of rotor and stator.

In some embodiments, the rotor and the components of the stator—in particular the stator winding(s) and the first carrier—may be embodied in such a way that, during the operation of the electric motor, the external magnetic field formed by the superordinate magnetic field outside of the electric motor has, at that location, a magnetic flux density of at least 5 mT, in particular at least 50 mT, or even at least 500 mT, at least in a subarea thereof. With such high magnetic flux densities, it is possible to detonate a magnetic mine even from a relatively great distance. In particular, such high magnetic flux densities may also be realized outside of the drone. For this purpose, an exterior wall of the drone may also be formed from nonmagnetic material. What is to be generally understood by a nonmagnetic material in connection with the present invention is a material having a relative permeability $\mu_r$ of at most 300.

In some embodiments, the electric motor may comprise at least one superconducting element. With such superconducting materials, it is possible to generate comparatively high magnetic fields using relatively small and lightweight components, which contributes in a particularly advantageous manner to the objective of providing a small and lightweight drone. In principle, however, the electrical components of the rotor and stator may also comprise normally conducting components exclusively, and the basic idea of the present invention may be realized nonetheless.

In some embodiments, the rotor of the electric motor may comprise at least one block composed of superconducting material in which a magnetic flux may be impressed in such a way that the at least one block acts like a permanent magnet. In particular, such a block may be a block formed from bulk superconducting material. In some embodiments, there may also be a plurality of such blocks present in order to generate a particularly high, constant magnetic field.

Various methods that are well-known in the prior art are available in order to impress a permanent magnetic flux in superconductors. Thus, for example, a magnetic flux may be impressed at a temperature above the critical or transition temperature at the location of the superconductor by means of an external magnetic coil or else a permanent magnet, said magnetic flux then being frozen in the superconducting material by cooling to a temperature below the critical temperature of the superconductor. Such methods are known in the prior art by the terms "field cooling" and "zero field cooling". An alternative method is the flux pump method. In this case, a magnetization is impressed in the superconducting material by way of magnetic field pulses at a cryogenic temperature below the critical temperature. A common feature shared by all of these methods is that the magnetic flux is retained in the superconductor after the external magnet used to impress the magnetization is removed, and the superconductor acts as a permanent magnet for as long as it is maintained at a temperature below its critical temperature.

In some embodiments, there are solid blocks made of superconducting material throughout. Such blocks may also be composed in each case of a plurality of superconducting tape conductors. In particular, such a block may be formed as a stack of such tape conductors. In this case, too, a magnetic flux may then be impressed in the respective block in such a way that the block acts like a permanent magnet, as described above.

In some embodiments, no energy is required to maintain the rotor magnetic field. Accordingly, there is also no need for any current supply leads from the warmer external environment to the cryogenic environment of the superconductor material, and the thermal losses occurring when the superconductor is cooled to a temperature below its critical temperature may be kept low. Because such superconducting components are not only easy to magnetize, but also easy to demagnetize—by heating, for example—they are also easily transportable. For example, electromagnetic compatibility requirements may be easily complied with when the superconducting components of the drone are not magnetized at times during which the drone is not in service.

In some embodiments, the rotor may comprise at least one superconducting field coil. Such a field excitation winding of the rotor may be supplied with electrical energy by way of a direct-current source, for example. However, owing to the negligible electrical losses of such a superconducting field excitation winding, it is also possible in principle to operate said winding in a mode known as the "quasi persistent current mode". This is of interest principally in the case of such embodiment variants in which the magnetic field decays in the short-circuited operating mode at less than 1% per hour. The field excitation winding of such a drone may then be charged by means of an external current source prior to deployment of the drone, and the field excitation winding of the drone may be operated during the latter's deployment of, for example, several hours without a current source for the field excitation winding(s). In some embodiments, electrical connections of the field excitation winding may also be dispensed with, as a result of which the thermal losses in the cryogenic environment of the superconducting winding(s) can be reduced.

Basically, given a similar size and design format, significantly stronger rotor magnetic fields can be realized with superconducting rotor field coils than with conventional normally conducting field coils. Or to put it another way, for a similar power output and similar magnetic flux, the electric motor may be constructed in a smaller and more lightweight format than would be possible with normally conducting windings, for example conventional copper windings. As a result of the low losses, the energy requirement is likewise lower than when using conventional conductors, so that even in a permanently fed mode of operation, less electrical power is required, and an energy store of the drone may accordingly be designed and dimensioned for a lower consumption of energy.

In some embodiments, the electric motor may also be embodied in such a way that its stator winding comprises a superconducting electrical conductor. In this case, too, significantly higher stator currents and/or significantly higher numbers of turns may be realized within the same construction volume compared to conventional copper windings. In some embodiments, the construction volume, and consequently also the weight, of the drone can also be reduced compared to a motor comprising normally conducting materials. Superconducting stator windings of said type enable a high external magnetic field to be realized outside of the electric motor.

Generally, and irrespective of whether the superconducting material in the rotor and/or stator is brought into service, said material may be embodied as a high-temperature superconducting material. High-temperature superconductors (HTS) are superconducting materials that have a critical temperature in excess of 25 K, and in some material classes, for example the cuprate superconductors, in excess of 77 K, in which the operating temperature can be reached by cooling with cryogenic materials other than liquid helium. Another reason why HTS materials are particularly attractive is that, depending on the choice of operating temperature, said materials can have high upper critical magnetic fields as well as high critical current densities. With such materials it is therefore particularly easy to generate high magnetic fields.

In some embodiments, such a high-temperature superconducting material may comprise magnesium diboride and/or a material of the type $REBa_2Cu_3O_x$, where RE stands for a rare earth element or a mixture of such elements. In the case of superconducting windings in the rotor and/or stator, the superconducting conductor may advantageously be implemented as a tape conductor.

In some embodiments, drone may comprise an energy store for storing electrical or chemical energy for the operation of the electric motor. In particular, the drone may have an electric battery and/or it may have a fuel tank for an electric generator. Alternatively, however, the drone may in principle also be supplied with energy during its deployment by a control system, for example a larger ship, through a cable connection.

In some embodiments, the drone may be embodied in such a way that the electric motor forms the sole magnetic triggering system for triggering sea mines. In that case there are therefore no further magnetic coils or permanent magnets present for generating an external magnetic field above the triggering threshold of sea mines. In some embodiments, however, there may well be an additional acoustic triggering system also present for triggering acoustic mines. In principle it is also conceivable that a further magnetic triggering system also be present, for example when a magnetic flux curve deviating from the magnetic field of the electric motor is to be generated or when a time-variable magnetic flux is to be generated.

In some embodiments, the electric motor may have a pole pair number between 1 and 5. With such a comparatively low pole pair number, it is relatively easy to generate a magnetic flux having a relatively high radial range in an outward direction. A relatively high external magnetic field for triggering the mines may therefore be easily made available.

The drone may advantageously be embodied to be moved under water. In some embodiments, however, it may in principle also be embodied as a drone floating on a water surface.

FIG. 1 shows a drone 1 according to a first exemplary embodiment in a schematic longitudinal section. The figure depicts a drone of elongate shape which is designed for locomotion under water. At its rearward portion (shown on the left in the drawing), it has a propeller. The drone is therefore equipped with an independent propulsion system, the propeller being driven in this case by way of a rotor shaft 7 of an electric motor 3. In this exemplary embodiment, the electric motor 3 occupies a large portion of the available interior space of the drone. However, the space taken up by the electric motor 3 may in principle also turn out to be smaller, for example in order to make space available for a control unit for controlling the motor and other steering units (not shown here) for guiding the drone. Furthermore, an energy store (likewise not shown here) in the form of a battery may also be present in the interior of the drone. Alternatively, a fuel tank, for example a diesel tank, and a generator for supplying the motor with electrical energy may be provided. A further alternative may be to supply the electric motor 3 with energy via an electric cable (not shown here).

The electric motor 3 comprises a rotor 9 which is arranged on the rotor shaft 7 and is coupled to the latter in a torque-locking manner in such a way that the propeller 5 can be driven via the rotor shaft 7. The electric motor 3 additionally comprises a stator 11 which is arranged radially outside of the rotor 9. In this arrangement the motor is therefore an internal rotor motor. The stator is in this case provided with a plurality of stator windings, the winding overhangs of which are represented schematically as small loops in the axial end regions of the stator 11.

Figure 2:
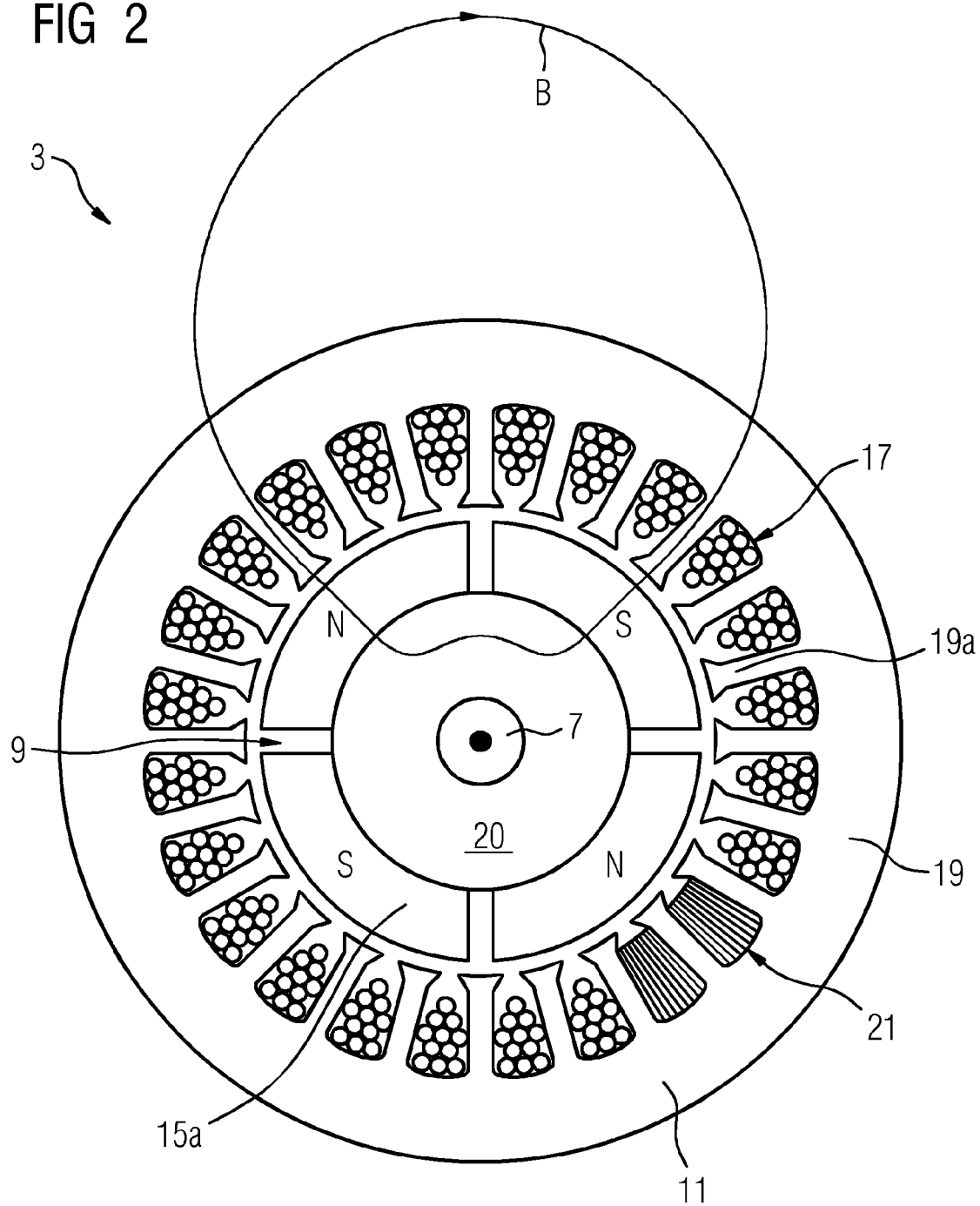
FIGS. 2 to 5 show exemplary motors 3 in a schematic cross-section, according to the teachings herein.

FIG. 2 shows a schematic cross-section of such an exemplary electric motor 3. It can be seen in this cross-sectional view that the stator 11 comprises a plurality of stator windings 17 which are retained by a first carrier 19 of the stator 11. Said stator windings are embedded on the radially internal side of said circular cylindrical first carrier 19 between teeth 19a that are present there.

In the example shown, the rotor 9 has a four-pole arrangement of permanent magnets 15a which are disposed symmetrically around the rotor shaft 7. In this arrangement, the permanent magnets 15a are embodied in such a way that two north poles N and two south poles S are located in alternating fashion on the radially external surface. When the electric motor 3 is in operation, the rotor 9 rotates inside the stator 11, and a time-variable superordinate magnetic field B as well as the torque for the drive are generated as a result of the electromagnetic interaction between the permanent magnets 15a and the stator windings 17.

In this exemplary embodiment, the first carrier 19 is embodied in its entirety from a nonmagnetic material, for example a nonmagnetic steel. This enables the formed magnetic flux to penetrate a good distance radially outward, above and beyond the structure of the stator 11 and the first carrier 19, as indicated by the field line drawn by way of example for the magnetic field B. The electric motor 3 is configured overall in such a way that an external magnetic field having a magnetic flux in excess of at least one of the previously cited threshold values may also be established outside of the motor housing 13 (not shown in FIG. 2). This means that magnetic fields B that are sufficient for triggering magnetic mines may also be generated outside of the drone as a whole.

The stator windings 17 may be embodied as conventional normally conducting windings, made of copper, for example. Alternatively, however, they may also be formed from superconducting conductors 21, as indicated in FIG. 2 for one of the stator windings by way of example.

Figure 3:
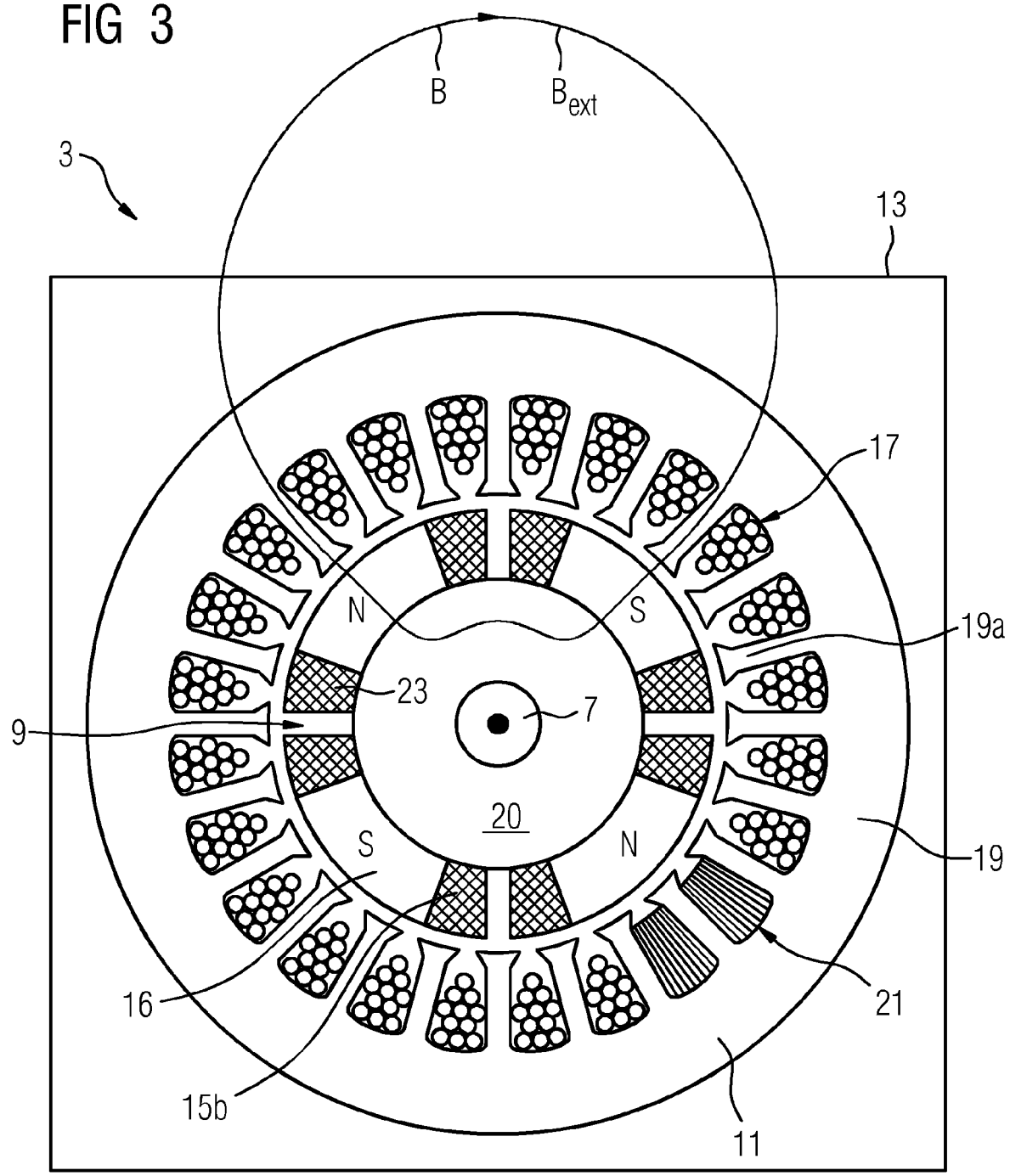

A further exemplary embodiment variant of the electric motor 3 is shown in FIG. 3. Said electric motor 3 is likewise shown in a schematic cross-section here, in this case together with its motor housing 13. The motor housing has a rectangular cross-section in this example. In some embodiments, however, it may also have a round, in particular circular cross-section, or the cross-section may at least have rounded corners or be formed as a polygon having more than four corners so that the electric motor 3 takes up less space in the interior of the drone. Corresponding housings may also find application for the electric motors of the other exemplary embodiments and are not shown there simply for clarity of illustration reasons.

The exemplary field line of the magnetic field B formed as a result of interaction between rotor and stator penetrates in this case into an area outside of the motor housing 13. The components of the electric motor 3 are configured overall in such a way that the external magnetic field $B_{ext}$ outside of the motor housing has a magnetic flux equal to at least one of the previously cited threshold values.

In the example of FIG. 3, the rotor 9 comprises no permanent magnets, but is equipped with four field coils 15b, which serve to generate the excitation magnetic field. In this case, too, the rotor 9 is embodied, exactly as in the first exemplary embodiment, as a four-pole rotor, i.e. there are two pole pairs. The configuration and effect of the stator windings 17 are in this case analogous to the described first exemplary embodiment. In particular, the stator windings may be formed in this case also either from normally conducting conductors or else also from superconducting conductors 21, as indicated for one of the stator windings by way of example.

Figure 4:
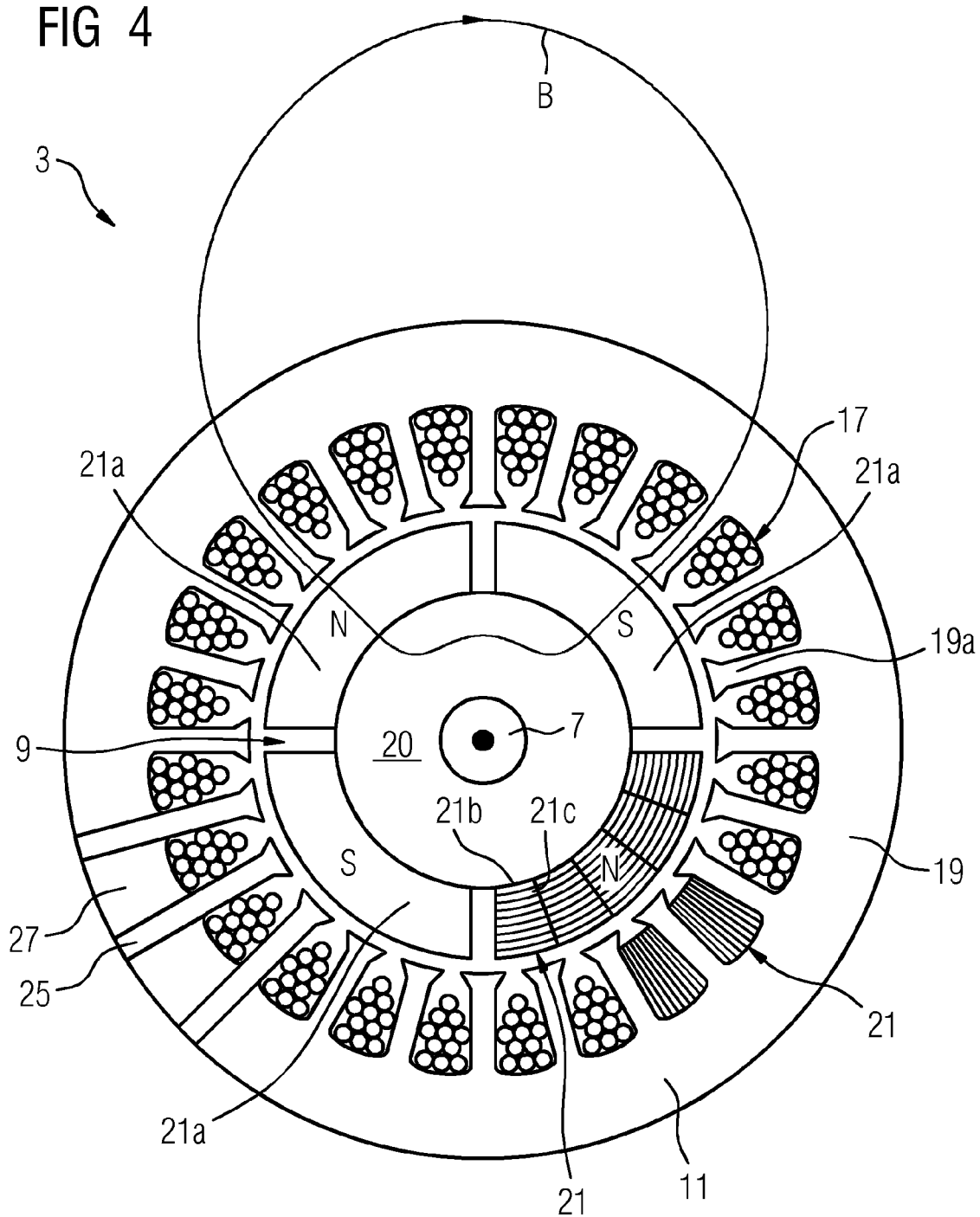

FIG. 4 shows a further exemplary embodiment of an electric motor 3 according to the teachings of the present disclosure. In this example, the rotor 9 comprises a plurality of superconducting blocks 21a or 21b in which a magnetic flux can be impressed in such a way that the block 21a or 21b acts like a permanent magnet. Said blocks may be embodied in different forms. For example, the blocks 21a may be embodied as superconducting solid bodies, as shown in FIG. 4 for three of the blocks by way of example. In such an embodiment variant, however, all of the blocks present would advantageously be embodied as superconducting solid bodies of said type. One of the blocks in FIG. 4 is shown only by way of example as a composite superconducting block 21b, which is formed by a plurality of stacks of, in each case, a plurality of superconducting tape conductors 21c superimposed on one another. In such an embodiment variant, all superconducting blocks of the rotor would then correspondingly also advantageously be constructed similarly to one another. Irrespective of the precise embodiment variant of the superconducting blocks, these are in any case suitable for allowing a predefined magnetic flux to be impressed, for example frozen, in them so that a magnetic field can be generated by the rotor 9 without requiring a separate dedicated current source for this purpose during operation. Here, too, there is shown by way of example a four-pole machine in which the blocks 21a or 21b form magnetic north and south poles alternately in each case on their radially external surface. However, a common feature applicable to each of the configurations shown is that other pole numbers are also suitable in principle, pole pair numbers between 1 and 5 generally being particularly preferred on account of the desired high radial range of the magnetic field B.

Generally, the first carrier 19 of the stator windings 17 is not required to be embodied throughout from a uniform material. By way of example, FIG. 4 shows in the lower left section of the first carrier 19 that this may be composed of alternating azimuthal segments made of different materials. In the section shown, these are radially continuous, soft-magnetic carrier segments 25 between the slots into which the stator windings 17 are embedded and nonmagnetic carrier segments 27 arranged radially outside of said slots. Other configurations are also possible, however. The important point is that the first carrier 19 is generally not formed throughout from soft-magnetic material in an annularly continuous manner. The described segmentation of the first carrier 19 is generally also applicable to the other embodiments of the electric motor shown in FIG. 2 or 3.

Figure 5:
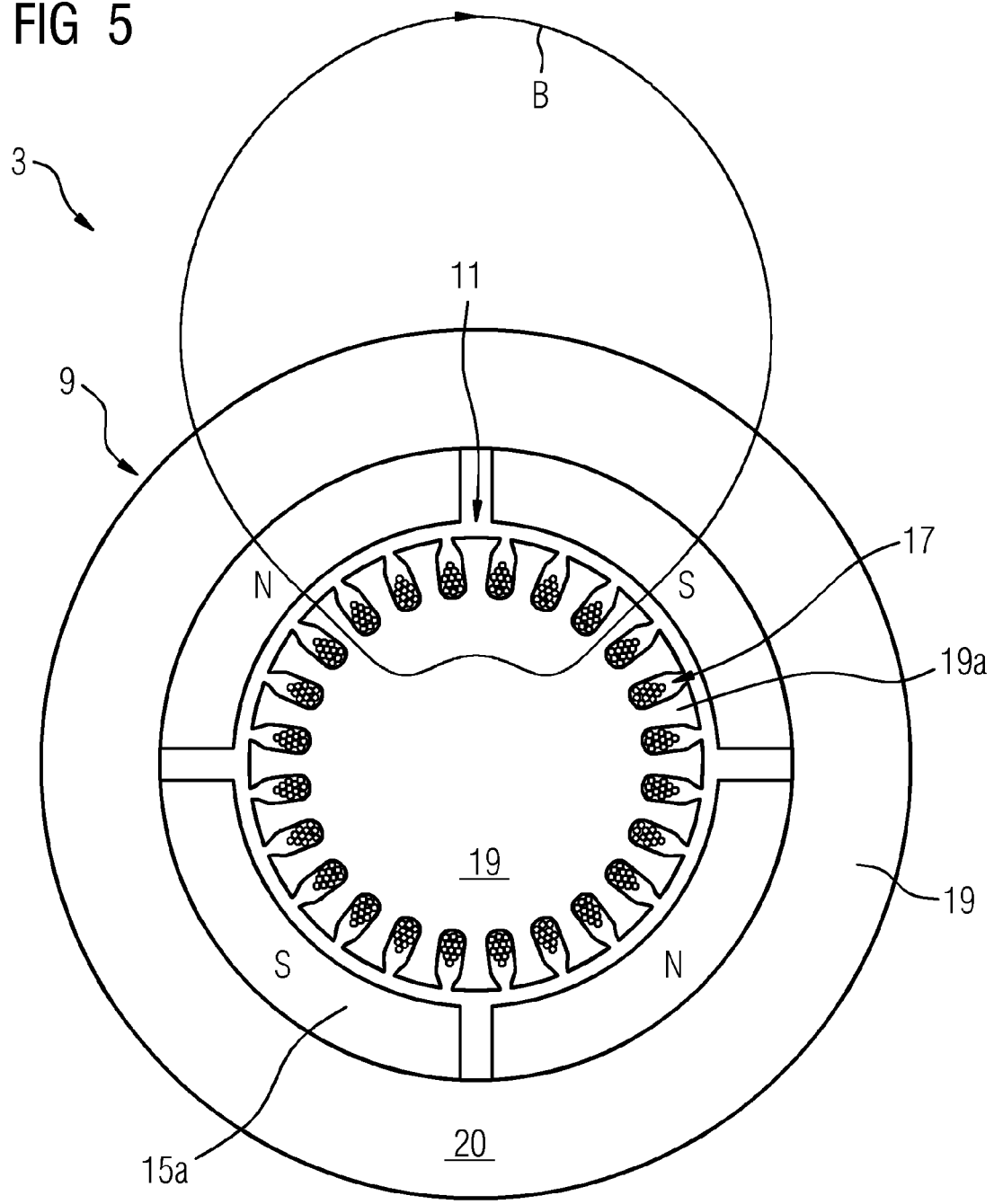

FIG. 5 shows by way of example an external rotor motor in which the rotatably mounted rotor 9 therefore radially surrounds the stationary stator 11. Correspondingly, the second carrier 20, which is part of the rotor 9, radially surrounds the first carrier 19, which is part of the stator 11. In this case, too, the stator windings 17 are arranged in slots between teeth 19a of the carrier 19 of the stator 11, albeit, in contrast to the internal rotor motors, on the radially external side of said carrier 19. The carrier 20 of the rotor supports the magnetic or electromagnetic elements which, together with the stator winding, generate the superordinate magnetic field, for which, once again by way of example, a field line B is drawn in the figure. In the example shown, said elements are permanent magnets 15a. In principle, however, normally conducting and/or superconducting field coils 15*b*, as well as solid or composite superconducting blocks 21*a* or 21*b*, may also find application in the external rotor motor, analogously to the examples of FIGS. 3 and 4 for the internal rotor motor. The stator windings 17, too, may be embodied analogously to the different variants of the internal rotor motor in this case also as normally conducting or else as superconducting windings.

For all of the different embodiments of the external rotor motor, the second carrier 20 of the rotor 9, which in this case is the further outward of the two carriers, may be embodied in such a way that a high proportion of the magnetic flux is conducted in an outward direction such that an external magnetic field having a correspondingly high magnetic flux $B_{ext}$ is also generated outside of a motor housing (not shown here), analogously to the described advantageous embodiment variants of the internal rotor motor. In contrast to conventional external rotor motors, the second carrier 20 is therefore not embodied as a soft-magnetic yoke which conducts the magnetic flux inside the carrier.

What is claimed is:

1. A drone for triggering sea mines by generating an external magnetic field, the drone comprising:
   a drive having an electric motor for locomotion in water;
   the electric motor comprising a stator and a rotor mounted on a rotor shaft;
   wherein the stator includes a stator winding arranged on a first carrier;
   the rotor includes a second carrier and a magnetic or electromagnetic element arranged on the second carrier;
   the magnetic or electromagnetic element and the stator forming a superordinate magnetic field during operation of the electric motor and forming an external magnetic field outside of the electric motor with a magnetic flux density of at least 0.5 mT.

2. The drone as claimed in claim 1, wherein the rotor is arranged radially inside the stator.

3. The drone as claimed in claim 1, wherein the stator is arranged radially inside the rotor.

4. The drone as claimed in claim 1, wherein at least one of the first carrier and the second carrier comprises multiple sections of a material with an effective relative permeability number μr of at most 300.

5. The drone as claimed in claim 1, further comprising a nonmagnetic motor housing.

6. The drone as claimed in claim 1, wherein:
   the electric motor comprises a synchronous motor; and
   the rotor includes an element for generating a magnetic field.

7. The drone as claimed in claim 1, wherein:
   the electric motor comprises an asynchronous motor; and
   the rotor includes an element forming a closed current path.

8. The drone as claimed in claim 1, wherein at least one of the first carrier and the second carrier comprises multiple sections of a material comprising a nonmagnetic steel and/or a plastic.

9. The drone as claimed in claim 1, wherein the electric motor comprises a superconducting element.

10. The drone as claimed in claim 9, wherein the rotor comprises a block of superconducting material.

11. The drone as claimed in claim 9, wherein the rotor comprises a block including a plurality of stacked superconducting tape conductors.

12. The drone as claimed in claim 9, wherein the rotor includes a superconducting field coil.

13. The drone as claimed in claim 9, wherein the stator winding includes a superconducting electrical conductor.

14. The drone as claimed in claim 9, wherein the superconducting electrical conductor comprises a superconducting material.

15. The drone as claimed in claim 6, wherein the rotor includes at least one of a permanent magnet or an electrical field coil.

16. The drone as claimed in claim 7, wherein the rotor includes at least one of a squirrel cage, an annularly short-circuited rotor coil, or a short-circuitable rotor coil.

17. The drone as claimed in claim 14, wherein the superconducting electrical conductor comprises at least one of magnesium diboride or a material having a formula: $REBa_2Cu_3O_x$.

* * * * *